SUBSTITUTED FOR MISSING COPY
199
C. MOREY & J. B. JOHNSON.
SEWING MACHINE.
No. 518.
Reissued Jan. 12, 1858.
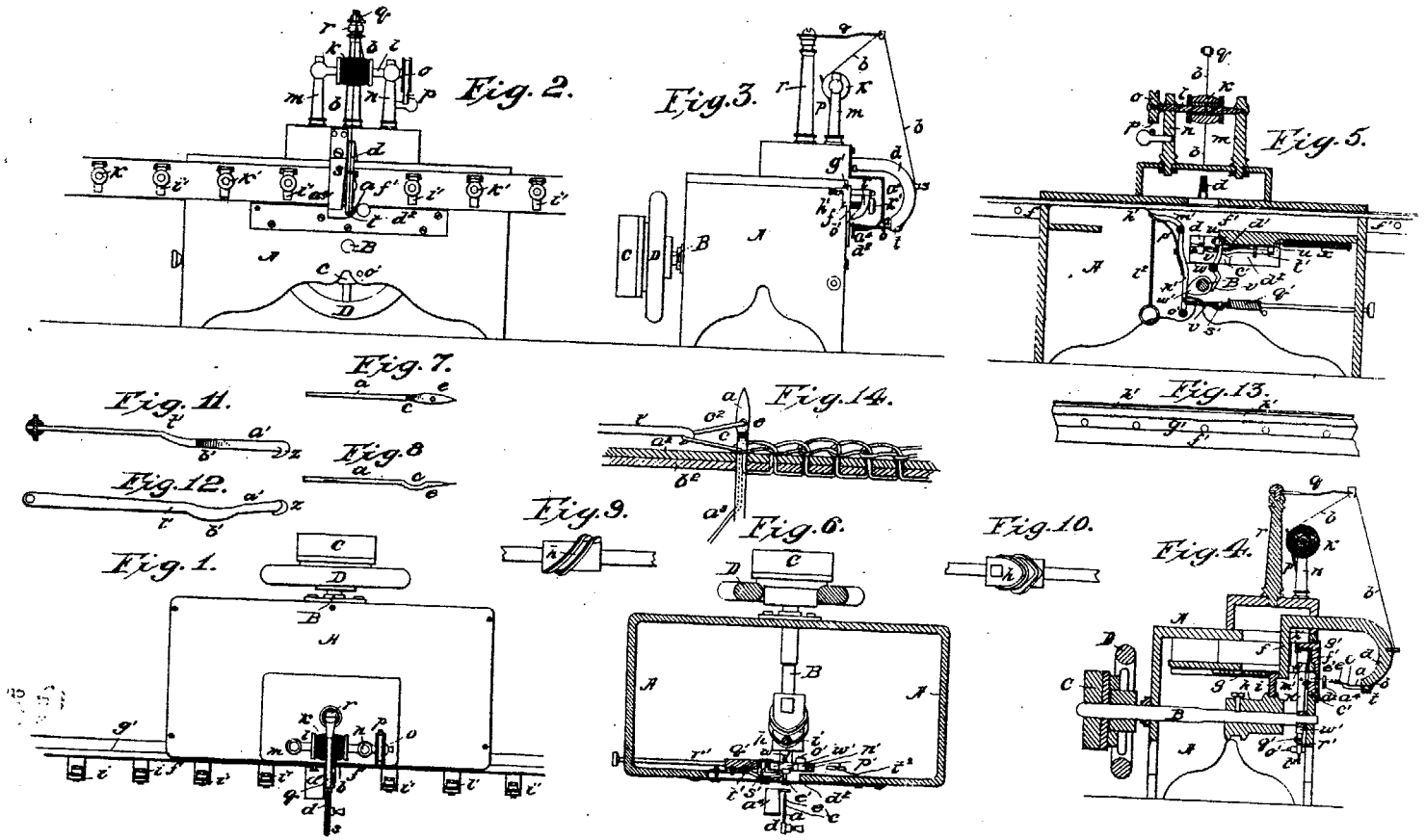

BEST AVAILABLE COPY

UNITED STATES PATENT OFFICE.

I. M. SINGER AND EDWARD CLARK, OF NEW YORK, N. Y., ASSIGNEES OF CHARLES MOREY AND JOSEPH B. JOHNSON, OF BOSTON, MASS.

IMPROVEMENT IN SEWING-MACHINES.

Specification forming part of Letters Patent No. 6,099, dated February 6, 1849; Reissue No. 268, dated June 27, 1854; Reissue No. 518, dated January 12, 1858.

*To all whom it may concern:*

Be it known that CHARLES MOREY and JOSEPH B. JOHNSON, of Boston, in the county of Suffolk and State of Massachusetts, have invented a new and useful machine for sewing cloth or any other material or materials to which it may be applicable; and we do hereby declare that the same is fully described and represented in the following specification and accompanying drawings, letters, figures, and references thereof.

The invention of the said MOREY and JOHNSON relates to the manner of controlling the cloth or other material to be sewed in close proximity with the needle, so that the stitches shall be more completely and uniformly drawn tight and the surface of the material kept smooth; and to this end the said invention consists in combining with an eye-pointed needle and a feeding apparatus a plate or equivalent therefor to make a self-adapting pressure on the material to be sewed in close proximity with the needle, and in such relation to the needle and the bed or other surface which resists the puncturing operation of the needle that the said yielding pressure shall act against the material to be sewed in the same direction as the needle when puncturing the same, and hold such material smooth and steady while the needle is being withdrawn, and at the same time be free to yield to the inequalities in the thickness of such material as it is moved along under such pressure by the feeding motion to space the stitches.

Of the said drawings, Figure 1 exhibits a top view of our said machine. Fig. 2 is a front elevation. Fig. 3 is an end elevation. Fig. 4 is a transverse vertical and central section. Fig. 5 is a longitudinal and vertical section taken through the axis of the bobbin and looking toward the front plate of the frame, the said section being so made as to represent the hook and the mechanism by which it is operated, together with that by which the cloth-bar is moved. Fig. 6 is a horizontal section taken just above the needle and the hook to be hereinafter described.

The kind of sewing which is effected by our machine is what is generally known under the name of "chain-stitch"—that is to say, the thread is passed through the cloth in the form of loops, each one of which is passed through the one next to it and in rear of it. The formation of the loops or stitches and their interlacement are produced in a very simple manner by the united operations of a needle and a hook, as we shall hereinafter explain.

In the drawings above mentioned, A exhibits a frame of metal or other proper material, made in a manner suitable to sustain the operative part applied to it. A driving-shaft, B, extends across the frame A, and has its journals supported in suitable bearings applied to the sides of the frame. The said shaft is to be put in operation by a crank or belt made to run over a pulley, C. A fly-wheel, D, is placed upon the said shaft in the position as seen in the drawings. This first element or part of the machine by which the stitch or loop is passed through the cloth is the needle. It is seen at *a*. It is made like a common needle, with the exception that the eye or hole *e*, which receives the thread *b*, is made through the needle very near to its point, as seen in Fig. 7, which denotes a top view of the needle. Just in rear of the eye-hole the needle is bent, or has a slight depression, as seen at *c* in Fig. 8, which denotes a side view of the needle. The needle is supported in a horizontal position, as seen in the drawings, by a curved arm, *d*, which projects from a standard, *f*, erected upon a horizontal slide-plate or carriage, *g*, which should be suitably sustained between parallel guides or ways, so as to be capable of being moved back and forth in a direction at right angles to the front face or side of the machine. A reciprocating rectilinear motion is imparted to the said carriage, and of course to the needle, by a grooved cam, *h*, and a stud, *i*, which project down from the under side of the carriage and into the groove of the cam. The said cam is represented in side view in Fig. 9 and top view in Fig. 10. The thread *b* is wound upon a bobbin, *k*, fixed upon a horizontal shaft, *l*, which is supported by and revolves in bearings made in two metallic standards, *m n*, arranged as seen in the drawings. On one end of the said shaft *l* there is a friction-pulley, *o*, against the periphery of which a spring, *p*, is made to bear with more or less force, according to the amount of friction required, to drag the thread close into the cloth as the loops or stitches are successively formed. From the bobbin the thread is passed through a hole or eye on the end of a spring, *q*, made to project from the top of a post, *r*. Thence the thread passes downward through guides *s t* on the arm *d*, and is carried upward through the eye of the needle, as seen in the drawings.

The hook which operates in connection with the needle becomes the next element for explanation. It is seen at *t'*. It is arranged at right angles to the needle, and is jointed, so as to play vertically, at its rear end to a slide-plate or carriage, *u*, which is supported in suitable guides, which admit of its being moved in a direction parallel to the front face of the frame. The reciprocating rectilinear movements of the carriage *u* and the hook *t'* are produced by the following-described mechanism: The front end of the carriage *n* is jointed to the upper arm of a lever, *v*, which moves on a fulcrum, *w*. The lower end of said lever rests against the periphery of a small cam or wiper, *w'*, placed upon the main or driving shaft just in rear of the front side plate of the frame. The other end of the carriage *u* is connected to one end of a spring, *x*, whose opposite end is attached to the frame. Now, when the cam *w'* is revolved, it acts against the lower arm of the lever *v* in such manner as to cause said lever to move on its fulcrum so as to produce an advance of the carriage *u* and the hook *t'* in a direction towards the needle. The spring *x* retracts the carriage after the extreme eccentric part of the cam has passed by or acted upon the lever. A top view of the hook is represented in Fig. 11 and a front side view of it in Fig. 12. The said hook is made in a peculiar manner—that is to say, it has its point *z* bent down below, or so as to make an angle with the shank *a'*, as represented in Fig. 12. This is necessary in order to enable the hook to seize the thread on the needle when the hook is retracted or drawn back over the needle. The loop which is formed upon said hook is caused by the peculiar construction of the hook to turn into a vertical position, so as to allow the needle to pass through it when it next advances. The shank of the hook is also formed with a small projecting bend, as seen at *b'*, Fig. 12, which bend rests and moves up and down upon an inclined or curved plane, *c'*, disposed under the hook, as seen in Fig. 5. The object of the said bend *b'* and the said plane *c'* is to allow the hook to descend a little directly after it has been drawn back from and beyond the needle, in order that the opening of the loop resting on the hook may be made large enough to insure the passage of the needle through the loop the next time said needle is advanced. A spring, *d'*, is arranged, as seen in Fig. 5, so as to press upon the hook and cause it to drop downward at the proper time. The cloth, when punctured by the needle, is supported by a plate, $d^2$, which has a small hole, *e'*, made through it for the passage of the needle. $a^4$ is a curved arm, which is intended to project down in front of the cloth and near the needle. It is for the purpose of preventing the needle from drawing the cloth forward too far when said needle is drawn out of the cloth.

The next portion of the mechanism to be specified is that by which the cloth is supported and regularly or properly advanced or moved laterally in one direction in order to cause a row of stitches or a line of sewing to be produced in said cloth. The cloth-bar, or carriage which supports the cloth, is seen at *f*, Figs. 1 and 2. An elevation of the rear side of it is exhibited in Fig. 13. It consists of a long bar arranged as seen in the drawings, and suitably supported so as to be capable of being moved horizontally and in a plane parallel to that of the front side of the frame. In other words, it has a dovetailed tenon, *g'*, projecting from its rear side and extending from one end of it to the other end of it, which tenon moves in a corresponding dovetailed groove made in the frame. A long rack of teeth, *h'* is affixed to and projects rearward from the inside face of the said tenon, as seen in Figs. 4 and 13. The front or outside face of the cloth-bar has a series of clamps, *i' t*, &c., or other proper contrivances applied to it, for the purpose of holding or confining to the bar the two pieces of cloth to be sewed together. Each of the said clamps consists of a jaw hinged to the plate and forced against the plate or cloth-bar by a set-screw, *k'*, which is made to pass through the jaw or clamp and to screw into the bar. A spring, *l'*, on each screw, and arranged between the clamp and bar, serves to press the clamp away from the cloth when the screw is loosened. The said bar is alternately moved the length of each stitch (when the needle is out of the cloth) and suffered to remain at rest while the needle is passing into, through, and out of the cloth, the same being effected in the following manner: A pawl, *m'*, is hinged to the top of a lever, *n'*, which turns upon a fulcrum, *o'*, all as seen in Fig. 5. The said pawl operates in the rack *h'*, and is forced up against the same by a spring, *p'*. The lever *n'* has a retractive spring, *q'*, affixed to it and the frame A. The said lever is actuated by the cam or wiper *w'*, before mentioned, which during its revolution so acts against the lever as to cause it to move the pawl and rack or cross-bar a short distance.

The extent of retraction of the lever and pawl, and of course the length of each stitch of sewing, is regulated by a screw, *r'*, which screws through a fixed stud or projection, *s'*, and abuts against the lever just above its fulcrum. By means of the said screw the pawl may be made at each retraction of it to slip over one, two, or more teeth of the rack of teeth, as occasion may require, in order that when the pawl is impelled forward it shall move the rack and cloth bar a corresponding distance.

The movement of the rack-bar may be arrested at any time by means of a wire, $t^2$, which is suspended to the pawl, it being necessary merely to pull on said wire so as to draw the pawl out of action on the rack.

Having thus described the manner in which the said sewing-machine is constructed, we shall now proceed to explain the method of forming the loops and each successive stitch of a series or row of stitches.

Fig. 14 represents on a large scale a diagram of the mode of forming loops and their interlacement. In the said figure $a^2 b^2$ are supposed to represent sections of two pieces of cloth to be sewed together. The needle is seen at $a$, the hook at $t'$, and the thread at $a^3$. As soon as the needle has been passed entirely through the two pieces of cloth $a^2$ $b^2$ and to the extent of its motion forward the hook $t'$ is made to advance and to pass above and over and across the needle and the thread lying on the upper side of it. This being accomplished, the hook is next retracted and suffered to fall vertically sufficiently to enable the point of it to pass into the depression $c$, Fig. 8, and below the thread lying over said depression, so as to catch or hook said thread and draw it laterally into the shape of a loop, as seen at $c^2$, Fig. 14. The needle is next retracted or drawn out of the cloth and the latter moved laterally the length of the next stitch. The needle is next forced forward through the cloth and the loop $c^2$, which, by the peculiar formation of the hook, will have been so turned upward as to permit the needle to pass through it. The hook is next advanced, and leaves the loop upon the needle and again seizes the thread on the upper side of the needle, and is retracted and forms a fresh loop, the process of looping and interlacing the loops being so continued until the whole line of loops is completed. The slack of thread will be taken up by the action of the spring $q$, while the tightness of the draft of it on the cloth will be regulated by the amount of friction exerted on the bobbin-shaft by the friction-pulley $o$ and spring $p$.

What we claim as the invention of the said MOREY and JOHNSON is—

In combination with an eye-pointed needle and a feeding apparatus for moving the cloth or other material to space the stitches, the employment of a plate, or equivalent therefor, to make a self-adapting pressure on the material to be sewed in close proximity with the needle, and in such relation to the needle and the bed or other surface which resists the puncturing operation of the needle that the said yielding pressure shall act against the said material in the same direction as the needle in its puncturing operation, and shall hold such material smooth and steady while the needle is being withdrawn and while the stitch is being drawn tight, the said yielding pressure being free to yield and adapt itself to the inequalities of such material as it is moved along by the feeding apparatus to space the stitches, substantially as described.

I. M. SINGER.
EDWARD CLARK.

Witnesses:
WM. H. BISHOP,
WM. C. BROWN.